United States Patent
Deniau et al.

(10) Patent No.: US 8,742,913 B2
(45) Date of Patent: *Jun. 3, 2014

(54) METHOD OF PREPARING A UNIVERSAL TIRE PRESSURE MONITORING SENSOR

(75) Inventors: Jean-Christophe Deniau, Fenton, MI (US); Brian J. Farrell, Troy, MI (US); John R. Costello, Rochester Hills, MI (US); Tejas B. Desai, Troy, MI (US); Franck Bigot, Neutraubling (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/358,828

(22) Filed: Jan. 26, 2012

(65) Prior Publication Data

US 2012/0117788 A1    May 17, 2012

Related U.S. Application Data

(63) Continuation of application No. 12/166,626, filed on Jul. 2, 2008.

(60) Provisional application No. 60/958,203, filed on Jul. 3, 2007.

(51) Int. Cl.
    *B60C 23/00*    (2006.01)
(52) U.S. Cl.
    USPC ............ 340/442; 340/445; 116/34 R; 73/146; 152/415
(58) Field of Classification Search
    USPC ................. 340/442, 447, 445; 73/146, 146.2; 116/34 R; 152/415, 416, 418
    See application file for complete search history.

(56) References Cited

U.S. PATENT DOCUMENTS

| | | | |
|---|---|---|---|
| 2,428,089 | A | 9/1947 | Mumma et al. |
| 2,451,859 | A | 10/1948 | Mumma et al. |
| 3,777,062 | A | 12/1973 | Ogawa |
| 3,814,839 | A | 6/1974 | Lubarsky et al. |

(Continued)

FOREIGN PATENT DOCUMENTS

| | | |
|---|---|---|
| DE | 4492128 | 6/1996 |
| DE | 19503756 | 8/1996 |

(Continued)

OTHER PUBLICATIONS

Jeff Burgess, "Tire Pressure Monitoring System Reference Design", Tire Pressure Monitor System Demo, AN1951/D, Rev 1, May 2003, Motorola, Inc., 2003 (24 pgs.).

(Continued)

*Primary Examiner* — George Bugg
*Assistant Examiner* — Edny Labbees

(57) ABSTRACT

A method of programming a tire pressure monitoring device includes the step of forming a physical interface between a tire pressure monitoring device and a programming device. The programming device includes a first memory including a plurality of selectable programs that provide instructions defining a communication protocol for communication between a tire pressure monitoring device and a receiver. The method further includes the step of selecting through a user interface of the programming device a desired one of the plurality of selectable programs and loading the selected one of the plurality of selectable programs from the first memory device of the programming device to a second memory device disposed within the tire pressure monitoring device.

33 Claims, 2 Drawing Sheets

(56) References Cited

U.S. PATENT DOCUMENTS

| | | |
|---|---|---|
| 3,814,840 A | 6/1974 | Lubarsky et al. |
| 4,589,063 A | 5/1986 | Shah et al. |
| 4,703,359 A | 10/1987 | Rumbolt |
| 4,734,674 A | 3/1988 | Thomas et al. |
| 4,737,761 A | 4/1988 | Dosjoub et al. |
| 4,742,857 A | 5/1988 | Gandhi |
| 4,774,511 A | 9/1988 | Rumbolt et al. |
| 4,924,210 A | 5/1990 | Matsui et al. |
| 4,959,810 A | 9/1990 | Darbee |
| 4,999,622 A | 3/1991 | Amano et al. |
| 5,061,917 A | 10/1991 | Higgs et al. |
| 5,196,682 A * | 3/1993 | Englehardt .................. 235/454 |
| 5,201,067 A | 4/1993 | Grube |
| 5,223,844 A | 6/1993 | Mansell |
| 5,228,077 A | 7/1993 | Darbee |
| 5,231,872 A | 8/1993 | Bowler et al. |
| 5,243,430 A | 9/1993 | Emmons |
| 5,255,313 A | 10/1993 | Darbee |
| 5,303,259 A | 4/1994 | Loveall |
| 5,335,540 A | 8/1994 | Bowler et al. |
| 5,365,225 A | 11/1994 | Bachhuber |
| 5,414,761 A | 5/1995 | Darbee |
| 5,434,572 A | 7/1995 | Smith |
| 5,455,570 A | 10/1995 | Cook |
| 5,515,052 A | 5/1996 | Darbee |
| 5,537,463 A | 7/1996 | Escobosa |
| 5,540,092 A | 7/1996 | Handfield et al. |
| 5,552,917 A | 9/1996 | Darbee |
| 5,562,787 A | 10/1996 | Koch et al. |
| 5,564,101 A | 10/1996 | Eisfeld et al. |
| 5,581,023 A | 12/1996 | Handfield et al. |
| 5,585,554 A | 12/1996 | Handfield et al. |
| 5,600,301 A | 2/1997 | Robinson, III |
| 5,602,524 A | 2/1997 | Mock et al. |
| 5,614,906 A | 3/1997 | Hayes |
| 5,624,265 A | 4/1997 | Redford |
| 5,661,651 A | 8/1997 | Geschke et al. |
| 5,663,496 A | 9/1997 | Handfield et al. |
| 5,698,353 A | 12/1997 | Jeong |
| 5,706,247 A | 1/1998 | Merritt et al. |
| 5,731,516 A | 3/1998 | Handfield et al. |
| 5,731,763 A | 3/1998 | Herweck |
| 5,741,966 A | 4/1998 | Handfield et al. |
| 5,768,499 A | 6/1998 | Treadway et al. |
| 5,808,558 A | 9/1998 | Meek et al. |
| 5,838,229 A | 11/1998 | Robinson, III |
| 5,841,390 A | 11/1998 | Tsui |
| 5,844,131 A | 12/1998 | Gabelmann et al. |
| 5,880,363 A | 3/1999 | Meyer et al. |
| 5,883,305 A | 3/1999 | Jo et al. |
| 5,900,808 A | 5/1999 | Lebo |
| 5,926,087 A | 7/1999 | Busch et al. |
| 5,959,751 A | 9/1999 | Darbee |
| 5,963,128 A | 10/1999 | McClelland |
| 5,965,808 A | 10/1999 | Normann et al. |
| 6,002,450 A | 12/1999 | Darbee |
| 6,005,486 A | 12/1999 | Fridley |
| 6,011,463 A | 1/2000 | Cormier, Sr. |
| 6,014,092 A | 1/2000 | Darbee |
| 6,018,993 A | 2/2000 | Normann et al. |
| 6,021,319 A | 2/2000 | Tigwell |
| 6,034,597 A | 3/2000 | Normann et al. |
| 6,078,270 A | 6/2000 | Shim |
| 6,087,930 A | 7/2000 | Kulka et al. |
| 6,112,165 A | 8/2000 | Uhl et al. |
| 6,124,786 A | 9/2000 | Normann et al. |
| 6,141,792 A | 10/2000 | Acker et al. |
| 6,154,658 A | 11/2000 | Caci |
| 6,155,119 A | 12/2000 | Normann et al. |
| 6,169,480 B1 | 1/2001 | Uhl et al. |
| 6,169,907 B1 | 1/2001 | Chang et al. |
| 6,181,241 B1 | 1/2001 | Normann et al. |
| 6,192,747 B1 | 2/2001 | Fennel |
| 6,194,999 B1 | 2/2001 | Uhl et al. |
| 6,201,819 B1 | 3/2001 | Luders |
| 6,204,758 B1 | 3/2001 | Wacker et al. |
| 6,208,341 B1 | 3/2001 | van Ee et al. |
| 6,218,936 B1 | 4/2001 | Imao |
| 6,259,361 B1 | 7/2001 | Robillard et al. |
| 6,271,748 B1 | 8/2001 | Derbyshire et al. |
| 6,275,148 B1 | 8/2001 | Takamura et al. |
| 6,297,731 B1 | 10/2001 | Flick |
| 6,298,095 B1 | 10/2001 | Kronestedt et al. |
| 6,333,698 B1 | 12/2001 | Roddy |
| 6,362,731 B1 | 3/2002 | Lill |
| 6,369,703 B1 | 4/2002 | Lill |
| 6,396,408 B2 | 5/2002 | Drummond et al. |
| 6,400,263 B1 | 6/2002 | Kokubo |
| 6,408,232 B1 | 6/2002 | Cannon et al. |
| 6,438,467 B1 | 8/2002 | Pacsai |
| 6,441,728 B1 | 8/2002 | Dixit et al. |
| 6,445,286 B1 | 9/2002 | Kessler et al. |
| 6,446,502 B1 | 9/2002 | Normann et al. |
| 6,453,737 B2 | 9/2002 | Young et al. |
| 6,463,798 B2 | 10/2002 | Niekerk et al. |
| 6,469,621 B1 | 10/2002 | Vredevogd et al. |
| 6,477,165 B1 | 11/2002 | Kosco |
| 6,486,773 B1 | 11/2002 | Bailie et al. |
| 6,489,888 B1 | 12/2002 | Honeck et al. |
| 6,490,452 B1 | 12/2002 | Boscovic et al. |
| 6,507,306 B1 | 1/2003 | Griesau |
| 6,518,891 B2 | 2/2003 | Tsutsui et al. |
| 6,567,032 B1 | 5/2003 | Mullaly |
| 6,571,617 B2 | 6/2003 | Van Niekerk et al. |
| 6,612,165 B2 | 9/2003 | Juzswik et al. |
| 6,622,552 B1 | 9/2003 | Delaporte |
| 6,630,885 B2 | 10/2003 | Hardman et al. |
| 6,633,229 B1 | 10/2003 | Normann et al. |
| 6,662,642 B2 | 12/2003 | Breed et al. |
| 6,667,687 B1 | 12/2003 | DeZorzi |
| 6,681,164 B2 | 1/2004 | Bergerhoff et al. |
| 6,693,522 B2 | 2/2004 | Tang et al. |
| 6,705,155 B2 | 3/2004 | Katou |
| 6,710,708 B2 | 3/2004 | McClelland et al. |
| 6,731,205 B2 | 5/2004 | Schofield et al. |
| 6,737,965 B2 | 5/2004 | Okubo |
| 6,738,697 B2 | 5/2004 | Breed |
| 6,747,590 B1 | 6/2004 | Weber |
| 6,750,761 B1 | 6/2004 | Newman |
| 6,774,778 B2 | 8/2004 | Lin |
| 6,778,380 B2 | 8/2004 | Murray |
| 6,788,193 B2 | 9/2004 | King et al. |
| 6,794,993 B1 | 9/2004 | Kessler et al. |
| 6,801,872 B2 | 10/2004 | Normann et al. |
| 6,802,213 B1 | 10/2004 | Agrotis |
| 6,804,999 B2 | 10/2004 | Okubo |
| 6,822,603 B1 | 11/2004 | Crimmins et al. |
| 6,828,905 B2 | 12/2004 | Normann et al. |
| 6,832,573 B2 | 12/2004 | Evans et al. |
| 6,871,157 B2 | 3/2005 | Lefaure |
| 6,879,252 B2 | 4/2005 | DeZorzi et al. |
| 6,885,282 B2 | 4/2005 | Desai |
| 6,885,292 B2 | 4/2005 | Katou |
| 6,885,293 B2 | 4/2005 | Okumura |
| 6,885,296 B2 | 4/2005 | Hardman et al. |
| 6,888,471 B2 | 5/2005 | Elsner et al. |
| 6,897,770 B2 | 5/2005 | Lill |
| 6,904,796 B2 | 6/2005 | Pacsai et al. |
| 6,906,624 B2 | 6/2005 | McClelland et al. |
| 6,910,627 B1 | 6/2005 | Simpson-Young et al. |
| 6,914,523 B2 | 7/2005 | Munch et al. |
| 6,915,146 B1 | 7/2005 | Nguyen et al. |
| 6,915,229 B2 | 7/2005 | Taguchi et al. |
| 6,919,798 B2 | 7/2005 | Ide |
| 6,920,785 B2 | 7/2005 | Toyofuku |
| 6,922,140 B2 | 7/2005 | Hernando et al. |
| 6,927,679 B2 | 8/2005 | Taguchi et al. |
| 6,941,803 B2 | 9/2005 | Hirohama et al. |
| 6,972,671 B2 | 12/2005 | Normann et al. |
| 6,983,649 B2 | 1/2006 | Katou |
| 6,996,418 B2 | 2/2006 | Teo et al. |
| 7,002,455 B2 | 2/2006 | Buck et al. |
| 7,010,968 B2 | 3/2006 | Stewart et al. |
| 7,015,801 B1 | 3/2006 | Juzswik |

(56) References Cited

U.S. PATENT DOCUMENTS

| | | | |
|---|---|---|---|
| 7,017,403 B2 | 3/2006 | Normann et al. | |
| 7,034,661 B2 | 4/2006 | Lonsdale et al. | |
| 7,039,397 B2 | 5/2006 | Chuey | |
| 7,042,348 B2 | 5/2006 | Schulze et al. | |
| 7,050,794 B2 | 5/2006 | Chuey et al. | |
| 7,084,749 B1 | 8/2006 | Honeck et al. | |
| 7,084,751 B2 | 8/2006 | Klamer | |
| 7,088,226 B2 | 8/2006 | McClelland et al. | |
| 7,095,316 B2 | 8/2006 | Kachouh et al. | |
| 7,096,003 B2 | 8/2006 | Joao et al. | |
| 7,103,460 B1 | 9/2006 | Breed | |
| 7,104,438 B2 | 9/2006 | Benedict | |
| 7,113,083 B2 | 9/2006 | Suitsu | |
| 7,116,213 B2 | 10/2006 | Thiesen et al. | |
| 7,116,218 B2 | 10/2006 | Ogawa et al. | |
| 7,120,430 B2 | 10/2006 | Christenson et al. | |
| 7,137,296 B2 | 11/2006 | Shida et al. | |
| 7,148,793 B2 | 12/2006 | Lin | |
| 7,161,466 B2 | 1/2007 | Chuey | |
| 7,161,476 B2 | 1/2007 | Hardman et al. | |
| 7,164,117 B2 | 1/2007 | Breed et al. | |
| 7,173,520 B2 | 2/2007 | Desai et al. | |
| 7,224,269 B2 | 5/2007 | Miller et al. | |
| 7,243,535 B2 | 7/2007 | Shimura | |
| 7,254,994 B2 | 8/2007 | Schulze et al. | |
| 7,307,480 B2 | 12/2007 | Shiu et al. | |
| 7,315,240 B2 | 1/2008 | Watabe | |
| 7,318,162 B2 | 1/2008 | Rineer et al. | |
| 7,369,491 B1 | 5/2008 | Beshai et al. | |
| 7,380,450 B2 | 6/2008 | Durif | |
| 7,414,523 B2 | 8/2008 | Li et al. | |
| 7,453,350 B2 | 11/2008 | Kachouh et al. | |
| 7,478,554 B2 | 1/2009 | Roth et al. | |
| 7,508,762 B2 | 3/2009 | Ohtani | |
| 7,512,109 B2 | 3/2009 | Trott et al. | |
| 7,518,495 B2 * | 4/2009 | Tang et al. | 340/445 |
| 7,519,011 B2 | 4/2009 | Petrus et al. | |
| 7,535,841 B1 | 5/2009 | Beshai et al. | |
| 7,642,904 B2 | 1/2010 | Crano | |
| 7,663,502 B2 | 2/2010 | Breed | |
| 7,688,192 B2 * | 3/2010 | Kenny et al. | 340/447 |
| 7,697,497 B2 | 4/2010 | Grube et al. | |
| 7,817,543 B2 | 10/2010 | Beshai et al. | |
| 7,884,707 B2 | 2/2011 | Wittliff et al. | |
| 7,885,603 B2 | 2/2011 | Santavicca | |
| 7,895,886 B2 | 3/2011 | Tozawa et al. | |
| 7,900,198 B2 | 3/2011 | Kasman | |
| 7,948,364 B2 | 5/2011 | Lin et al. | |
| 8,013,725 B2 | 9/2011 | Murata et al. | |
| 8,019,323 B2 | 9/2011 | Jheng et al. | |
| 8,027,359 B2 | 9/2011 | Iwamura | |
| 8,031,598 B2 | 10/2011 | Beshai et al. | |
| 8,082,579 B2 | 12/2011 | Shimizu et al. | |
| 8,155,617 B2 | 4/2012 | Magnusson et al. | |
| 8,330,594 B2 | 12/2012 | Suzuki et al. | |
| 2001/0050611 A1 | 12/2001 | Achterholt | |
| 2002/0030592 A1 | 3/2002 | Laitsaari et al. | |
| 2002/0059825 A1 | 5/2002 | Lundqvist | |
| 2002/0067285 A1 | 6/2002 | Lill | |
| 2002/0075145 A1 * | 6/2002 | Hardman et al. | 340/442 |
| 2002/0084895 A1 | 7/2002 | Dixit et al. | |
| 2002/0086708 A1 | 7/2002 | Teo et al. | |
| 2002/0121132 A1 | 9/2002 | Breed et al. | |
| 2002/0126005 A1 | 9/2002 | Hardman et al. | |
| 2002/0130803 A1 | 9/2002 | Conway et al. | |
| 2002/0144134 A1 | 10/2002 | Watanabe et al. | |
| 2002/0168795 A1 | 11/2002 | Schuumans | |
| 2002/0186320 A1 | 12/2002 | Carlsgaard | |
| 2002/0190852 A1 | 12/2002 | Lin | |
| 2003/0005759 A1 | 1/2003 | Breed et al. | |
| 2003/0009270 A1 | 1/2003 | Breed | |
| 2003/0030553 A1 | 2/2003 | Schofield et al. | |
| 2003/0050070 A1 | 3/2003 | Mashinsky et al. | |
| 2003/0071723 A1 | 4/2003 | Tang et al. | |
| 2003/0079537 A1 | 5/2003 | Luce | |
| 2003/0080860 A1 | 5/2003 | Stewart et al. | |
| 2003/0080861 A1 | 5/2003 | Okubo | |
| 2003/0095553 A1 | 5/2003 | Shiomoto et al. | |
| 2003/0110851 A1 | 6/2003 | Tsujita | |
| 2003/0112138 A1 | 6/2003 | Marguet et al. | |
| 2003/0117276 A1 | 6/2003 | Marguet et al. | |
| 2003/0117277 A1 | 6/2003 | Marguet et al. | |
| 2003/0131297 A1 | 7/2003 | Fischel et al. | |
| 2003/0179082 A1 | 9/2003 | Ide | |
| 2003/0197594 A1 | 10/2003 | Olson et al. | |
| 2003/0197595 A1 | 10/2003 | Olson et al. | |
| 2003/0197603 A1 | 10/2003 | Stewart et al. | |
| 2003/0228879 A1 | 12/2003 | Witkowski | |
| 2004/0039509 A1 | 2/2004 | Breed | |
| 2004/0041698 A1 | 3/2004 | Lin | |
| 2004/0061601 A1 | 4/2004 | Freakes | |
| 2004/0113765 A1 | 6/2004 | Suitsu | |
| 2004/0130442 A1 | 7/2004 | Breed et al. | |
| 2004/0149025 A1 | 8/2004 | Toyofuku | |
| 2004/0172179 A1 | 9/2004 | Miwa | |
| 2004/0174246 A1 | 9/2004 | Mitchell | |
| 2004/0203370 A1 | 10/2004 | Luo et al. | |
| 2004/0215382 A1 | 10/2004 | Breed et al. | |
| 2005/0039103 A1 | 2/2005 | Azenko et al. | |
| 2005/0046584 A1 | 3/2005 | Breed | |
| 2005/0075145 A1 * | 4/2005 | Dvorak et al. | 455/572 |
| 2005/0104722 A1 | 5/2005 | Tang et al. | |
| 2005/0134446 A1 | 6/2005 | Stewart et al. | |
| 2005/0156722 A1 | 7/2005 | McCall et al. | |
| 2005/0179530 A1 | 8/2005 | Stewart et al. | |
| 2005/0192727 A1 | 9/2005 | Shostak et al. | |
| 2005/0264405 A1 | 12/2005 | Ueda | |
| 2006/0001535 A1 | 1/2006 | Hafele et al. | |
| 2006/0006992 A1 | 1/2006 | Daiss et al. | |
| 2006/0012475 A1 | 1/2006 | Froitzheim et al. | |
| 2006/0017554 A1 | 1/2006 | Stewart et al. | |
| 2006/0022813 A1 | 2/2006 | Schulze et al. | |
| 2006/0025897 A1 | 2/2006 | Shostak et al. | |
| 2006/0044125 A1 | 3/2006 | Pierbon | |
| 2006/0114107 A1 | 6/2006 | Kim et al. | |
| 2006/0145829 A1 | 7/2006 | Watabe | |
| 2006/0148456 A1 | 7/2006 | Chuey | |
| 2006/0152342 A1 | 7/2006 | Turner et al. | |
| 2006/0161327 A1 | 7/2006 | Emmerich et al. | |
| 2006/0187014 A1 | 8/2006 | Li et al. | |
| 2006/0192661 A1 | 8/2006 | Gerardiere | |
| 2006/0201241 A1 | 9/2006 | Durif | |
| 2006/0217850 A1 | 9/2006 | Geerlings et al. | |
| 2006/0235641 A1 | 10/2006 | Fink et al. | |
| 2006/0273889 A1 | 12/2006 | Schulze et al. | |
| 2007/0063814 A1 | 3/2007 | Olson et al. | |
| 2007/0069947 A1 | 3/2007 | Banet et al. | |
| 2007/0176736 A1 | 8/2007 | Chuey et al. | |
| 2007/0182531 A1 | 8/2007 | Kuchler | |
| 2007/0190993 A1 | 8/2007 | Chuey et al. | |
| 2007/0194898 A1 | 8/2007 | Fukumori | |
| 2007/0210920 A1 | 9/2007 | Panotopoulos | |
| 2007/0213951 A1 | 9/2007 | Van Eeden | |
| 2007/0223484 A1 | 9/2007 | Crowle et al. | |
| 2007/0247294 A1 | 10/2007 | Baader et al. | |
| 2008/0001729 A1 | 1/2008 | Kyllmann et al. | |
| 2008/0024287 A1 | 1/2008 | Boyle et al. | |
| 2008/0037458 A1 | 2/2008 | Myszne | |
| 2008/0062880 A1 | 3/2008 | Yew et al. | |
| 2008/0080447 A1 | 4/2008 | Grube et al. | |
| 2008/0094198 A1 * | 4/2008 | Yu | 340/447 |
| 2008/0100430 A1 | 5/2008 | Kochie et al. | |
| 2008/0141766 A1 | 6/2008 | Roth et al. | |
| 2008/0143593 A1 | 6/2008 | Graziano et al. | |
| 2008/0173082 A1 | 7/2008 | Hettle et al. | |
| 2008/0177441 A1 | 7/2008 | Marlett et al. | |
| 2008/0282965 A1 | 11/2008 | Crano | |
| 2009/0033478 A1 | 2/2009 | Deniau et al. | |
| 2009/0231114 A1 | 9/2009 | Yu | |
| 2009/0267751 A1 | 10/2009 | Kaleal et al. | |
| 2011/0140876 A1 | 6/2011 | Deniau | |
| 2012/0001745 A1 | 1/2012 | Li | |

(56) References Cited

U.S. PATENT DOCUMENTS

FOREIGN PATENT DOCUMENTS

| | | |
|---|---|---|
| DE | 19720123 | 7/1998 |
| DE | 19924830 | 11/2000 |
| DE | 10014076 | 10/2001 |
| DE | 10040238 | 3/2002 |
| DE | 10247761 | 6/2003 |
| DE | 10217239 | 7/2003 |
| DE | 10207014 | 8/2003 |
| DE | 10307265 | 10/2003 |
| DE | 69529456 | 11/2003 |
| DE | 10247149 | 4/2004 |
| DE | 60108973 | 7/2005 |
| DE | 60202342 | 12/2005 |
| DE | 60023387 | 7/2006 |
| DE | 102005004825 | 8/2006 |
| DE | 102005059009 | 6/2007 |
| DE | 102007039599 | 3/2008 |
| DE | 102008008237 | 8/2009 |
| EP | 793579 | 9/1997 |
| EP | 1026016 | 8/2000 |
| EP | 1291230 | 3/2003 |
| EP | 1428694 | 6/2004 |
| EP | 1494877 | 1/2005 |
| EP | 1547827 | 6/2005 |
| EP | 1562162 | 8/2005 |
| EP | 1026015 | 5/2006 |
| EP | 1352763 | 4/2008 |
| EP | 1340629 | 6/2008 |
| GB | 2387032 | 10/2003 |
| GB | 2420415 | 5/2006 |
| JP | 62003537 | 1/1987 |
| JP | 63090407 | 4/1988 |
| JP | 05107134 | 4/1993 |
| JP | 8244423 | 9/1996 |
| JP | 2000142044 | 5/2000 |
| JP | 2000238515 | 9/2000 |
| JP | 2001080321 | 3/2001 |
| JP | 2003025817 | 1/2003 |
| JP | 2004-145474 | 5/2004 |
| JP | 2005289116 | 10/2005 |
| JP | 2006015832 | 1/2006 |
| JP | 2007200081 | 8/2007 |
| JP | 2007283816 | 11/2007 |
| JP | 2008137585 | 6/2008 |
| KR | 2003068216 | 8/2003 |
| RU | 2238190 | 10/2004 |
| WO | 9420317 | 9/1994 |
| WO | 9422693 | 10/1994 |
| WO | 9908887 | 2/1999 |
| WO | 0072463 | 11/2000 |
| WO | 0145967 | 6/2001 |
| WO | 02094588 | 11/2002 |
| WO | 03016079 | 2/2003 |
| WO | 2004038674 | 5/2004 |
| WO | 2005085651 | 9/2005 |
| WO | 2005116603 | 12/2005 |
| WO | 2008103973 | 8/2008 |
| WO | 2008106387 | 9/2008 |
| WO | 2008107430 | 9/2008 |

OTHER PUBLICATIONS

"Motorola's MPXY8000 Series Tire Pressure Monitoring Sensors", Motorola Sensor Products Division Transportation & Standard Products Group, Motorola, Inc., May 2003 (22 pgs.).

Alfred Pohl et al. "Wirelessly Interrogable Surface Acoustic Wave Sensors for Vehicular Applications", IEEE Transactions on Instrumentation and Measurement vol. 46, No. 4, IEEE, Aug. 1997 (8 pgs.).

"Tire Pressure Warning System Using Direct Measurement Method (SOARER)" G0880A ISSN: 0388-3841, vol. 51, No. 7, pp. 174-179, Toyota Motor Corporation, May 2, 2002 (6 pgs.).

International Search Report and Written Opinion mailed on Oct. 15, 2008 for Application No. PCT/US2008/069006.

International Preliminary Report on Patentability mailed on Jan. 14, 2010 for Application No. PCT/US2008/069006.

"Sony Remote Commander Operating Instructions RM-V701/V801", 1998, Sony Corporation.

"RadioShack 8-in-One Touch Screen Remote Control", Owner's Manual, 2001, RadioShack Corporation.

Kais Mnif, "A Smart Tire Pressure Monitoring System", Sensors Magazine, Nov. 1, 2001.

Jeff Burgess, "TPMS Demonstration Kit", AN1943/D, Rev 1, Apr. 2002, Motorola, Inc., 2002 (16 pgs.).

USPTO Translation JP2003025817A, translated from Japanese by Schreiber Translations, Inc., Feb. 2013.

\* cited by examiner

US 8,742,913 B2

METHOD OF PREPARING A UNIVERSAL TIRE PRESSURE MONITORING SENSOR

CROSS REFERENCE TO RELATED APPLICATION

This application is a continuation of pending U.S. patent application Ser. No. 12/166,626 filed on Jul. 2, 2008 which claims priority to U.S. Provisional Application No. 60/958,203 which was filed on Jul. 3, 2007.

BACKGROUND OF THE INVENTION

This disclosure relates to tire pressure monitoring devices. More particularly, this disclosure relates to a universal tire pressure monitoring device and method that is adaptable for operation according to different manufacture protocols.

A tire pressure monitoring device is typically mounted to a wheel within the tire and transmits information indicative of conditions within the tire. The transmissions and order of information are defined by a defined protocol corresponding to a receiver within the vehicle. Each automobile manufacturer has a unique preferred defined protocol to meet application specific needs and designs.

Disadvantageously, such different and unique protocols require corresponding unique tire pressure monitoring sensors, thereby complicating maintenance and service operations.

SUMMARY OF THE INVENTION

A disclosed example tire pressure monitoring device includes a memory that is configurable to either hold a plurality of communication protocols or to be flash programmed with a single communication program to govern operation.

An example disclosed tire pressure monitoring device includes a memory that holds several different communication protocols. Each of these communication protocols correspond to each manufacturers preferred communications protocol.

The example disclosed tire pressure monitoring device includes a memory device adapted to store a plurality of different communication protocols. Upon installation of the tire pressure monitoring device, a programming module initiates a signal to each of the tire pressure monitoring devices that selects which communication protocol will govern operation of that tire pressure monitoring device.

Another disclosed example tire pressure device includes a memory that does not include a communications protocol. The tire pressure monitoring device is flash programmed from a programming device including each of the different communication protocols for each of the different original equipment manufacturers. The tire pressure monitoring device is interfaced with the programming device and flash programmed with the desired communication protocol. The programmed tire pressure monitoring devices is then installed within the vehicle tire.

Accordingly, the example tire pressure monitoring devices are capable of operating with different systems and operating according to different communications protocols.

These and other features of the present invention can be best understood from the following specification and drawings, the following of which is a brief description.

DETAILED DESCRIPTION OF THE PREFERRED EMBODIMENT

Figure 1:
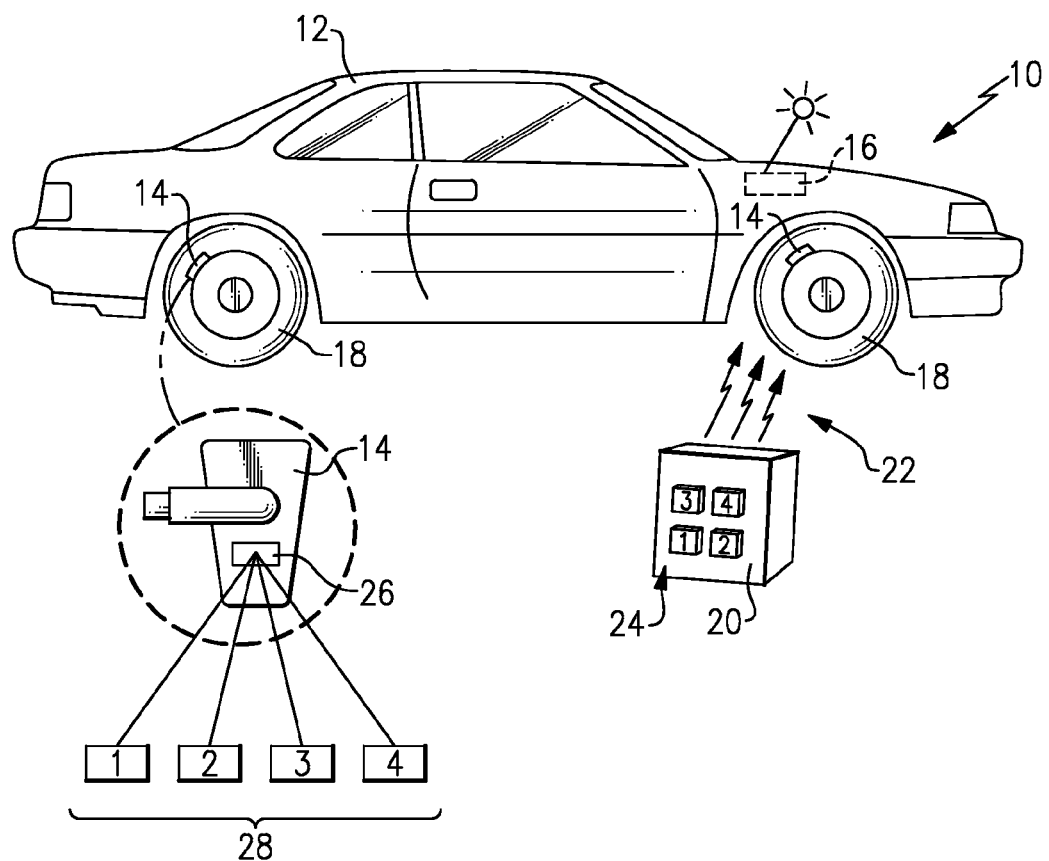
FIG. 1 is a schematic representation of an example universal tire pressure monitoring system.

Referring to FIG. 1, a tire pressure monitoring system 10 is shown assembled within a vehicle 12. The system 10 includes a receiver 16 that receives communications from tire pressure monitoring devices 14 assembled within each of the vehicle's tires 18. As is understood by those skilled in the art, each of the tire pressure monitoring devices 14 are assembled within the tires 18 and communicate information indicative of conditions within the tires 18 to the receiver 16. These conditions include temperature, pressure, and any other desired information that aids in the monitoring of tire conditions.

The example system 10 includes the tire pressure monitoring devices 14 that all include a memory device 26. The memory device 26 is utilized for the storage of a plurality of communication protocols 28. The communication protocols 28 include individual and unique protocols that govern operation and communication between the tire pressure monitoring device 14 and the receiver 16. Because each tire pressure monitoring device 14 includes several desired communication protocols for different manufacturers, all that is required is that the tire pressure monitoring device 14 be installed within the tire 18. Once the tire pressure monitoring device 14 is installed with the tire 18, one of the plurality of communication protocols 28 is selected to govern operation and communication.

Selection of a desired one of the communication protocols is accomplished through the use of a programming device 20. The example programming device 20 emits a wireless signal 22 that is received by a corresponding one of the tire pressure monitoring devices 14. The programming device 20 includes a series of selectable buttons 24 that are actuated by an operator to indicate which of the several communication protocols is desired for that tire pressure monitoring device to operate. Although the example device 20 is shown with buttons, other display and selection configurations, such as touch screen or other selection interface are within the contemplation of this invention.

Accordingly, installation of the example universal tire pressure monitoring devices 14 includes the initial step of physically installing the tire pressure monitoring devices 14 within each of the corresponding tires 18. At this step in the installation process, no communication protocol selection is required. This is so because each of the tire pressure monitoring devices 14 has stored within it all of the desired communication protocols 28 required for communicating with any of several original equipment receivers 15.

Once the tire pressure monitoring devices 14 are physically installed within each of the tires 18, the programming device 20 is actuated. The programming device is placed proximate each of the tire pressure monitoring devices 14 to send a signal 22. The example signal 22 is a low frequency transmission received by the proximate tire pressure monitoring device 14. The signal 22 triggers the tire pressure monitoring device to operate according to a selected one of the stored communication protocols 28. For example, in this instance, if the operator selects button number one, the corresponding tire pressure monitoring device 14 will operate according to the stored communication protocol 28 indicated as 1. The tire pressure monitoring device 14 can be reclaimed and the communication protocol reset by deactivating a currently selected one of the plurality of selectable communication protocols 28 and selecting a different one of the plurality of selectable programs 28.

Of course it is within the contemplation of this invention that the controller may include other control operations not just the buttons 24 indicated in the illustrated example. Further, it is also within the contemplation of this invention that the programming device 20 may utilize other wireless communication protocols to communicate and trigger the selection of the desired communication protocol in which the corresponding tire pressure monitoring device 14 would operate.

Figure 2:
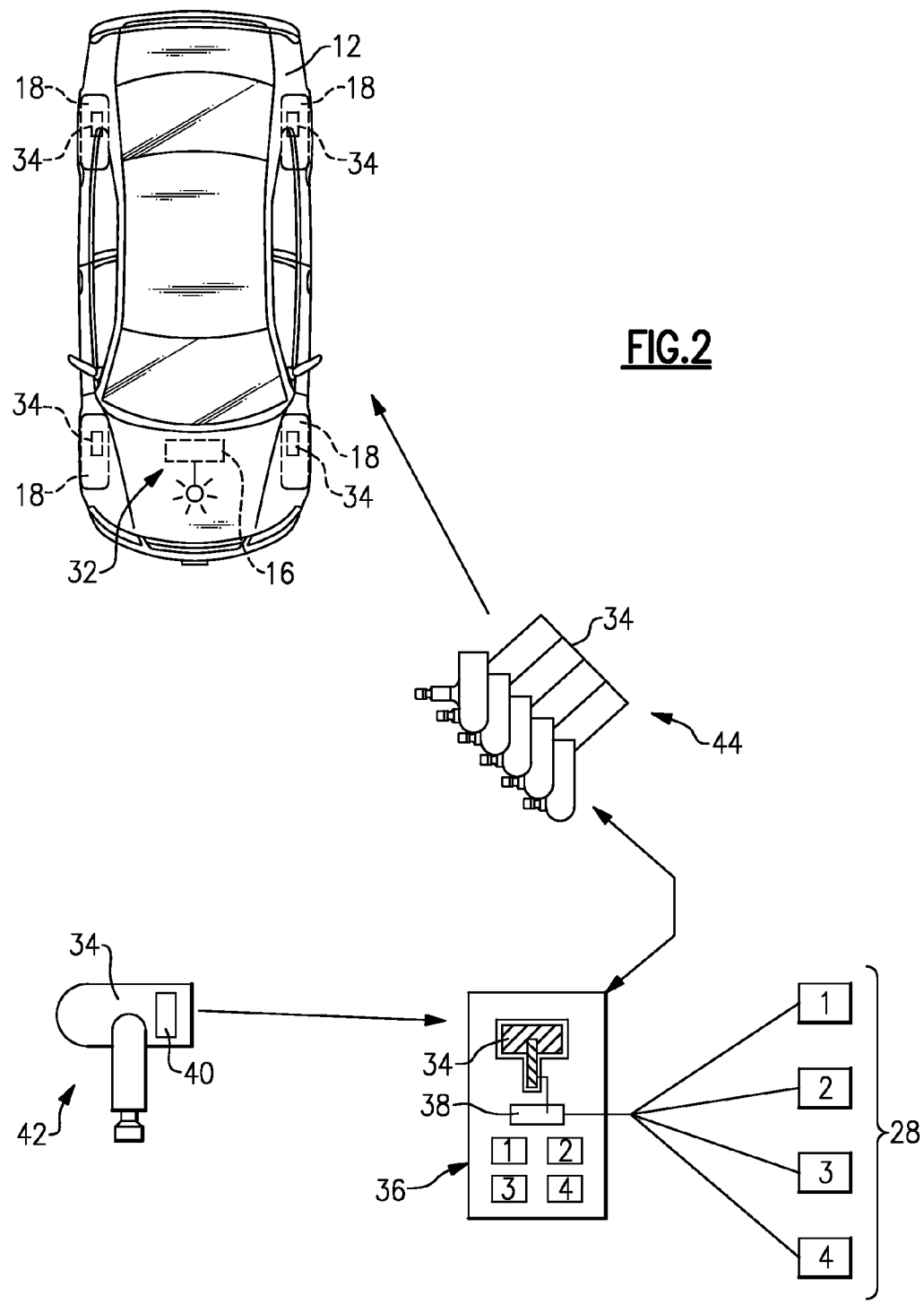
FIG. 2 is a schematic representation of another example universal tire pressure monitoring system.

Referring to FIG. 2, another example tire pressure monitoring system 32 utilizes a tire pressure monitoring device 34 that includes a memory 40. The memory 40 of the tire pressure monitoring device 34 does not include any communication protocol data. Instead, the memory 40 is provided with a space for a communications protocol. The tire pressure monitoring device 34 with the blank memory 40 is in essence a blank slate as indicated by 42. The blank tire pressure monitoring device 42 is inserted within a programming device 36. The programming device 36 includes a memory device 38 that stores the plurality of communication protocols 28. The tire pressure monitoring device 34 is placed into electrical communication by way of an interface with the programmer 36. The programmer 36 is then actuated to download or flash program one of the communication protocols 28 from the memory device 38 into the memory device 40 of the tire pressure monitoring device. This step is accomplished prior to installation into the vehicle 12.

Accordingly, each tire pressure monitoring device 34 that is to be assembled into a vehicle is first flash programmed using the programming device 36 to install and select a desired communication protocol 28. The tire pressure monitoring device is thereby set and capable of operation only according to that flash programmed communication protocol. Programmed tire pressure monitoring devices 34 are indicated as being programmed by reference numeral 44, can then be installed within the vehicle 12 to operate with the specific vehicle receiver 16.

During the installation process of the example system illustrated in FIG. 2, a plurality of blank tire pressure monitoring devices 34 would be available for flash programming upon the desired need. The example non-programmed tire pressure monitoring devices are indicated at 42. Prior to installation within the vehicle 12, each tire pressure monitoring device 34 is loaded with a program by the programming device 36. The example interface between the programming device 36 and the tire pressure monitoring device 34 is a physical connection. However, wireless connections could also be utilized for loading the desired communication protocol into the tire pressure monitoring device 34. The programmed tire pressure monitoring devices indicated at 44 can then be installed within the vehicle 12.

It should be understood that a computing device can be used to implement various functionality and operation of the example programming devices 20, and 36. In terms of hardware architecture, such a computing device can include a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. When constructed as a source program, the program is translated via a compiler, assembler, interpreter, or the like, which may or may not be included within the memory.

Accordingly, the example tire pressure monitoring devices 14, 34 and programming devices 20, 36 provide a system and device capable of operating according to different communication protocols.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of programming a tire pressure monitoring device comprising:

mounting a tire pressure monitoring device to a mounting location of a programming device to establish a physical interface therebetween, the programming device including a first memory including a first program and a second program, the first program configured to govern operations and communications of the tire pressure monitoring device according to a first protocol associated with a first automobile manufacturer, the second program configured to govern operations and communications of the tire pressure monitoring device according to a second protocol associated with a second automobile manufacturer, wherein the physical interface comprises a cavity corresponding to a shape of the tire pressure monitoring device;

selecting through a user interface of the programming device a desired one of the first program or the second program, the selection being accomplished by an indicator that is non-specific to an automobile manufacturer;

loading the selected one of the first program or the second program from the first memory device of the programming device to a second memory device disposed within the tire pressure monitoring device; and wherein selecting the first program or the second program causes the deactivation of a third program that has been active immediately before the deactivation occurs in the tire pressure monitoring device, the deactivation occurring after initialization of the tire pressure monitoring device is complete.

2. The method as recited in claim 1, wherein the mounting location of the programming device includes the physical interface for holding the tire pressure monitoring device on the programming device.

3. The method as recited in claim 1, wherein the physical interface includes a physical electric connection between the tire pressure monitoring device and the programming device, and the selected first program or the second program is loaded from the first memory device to the second memory device over the physical electrical connection.

4. The method as recited in claim 2, wherein the mounting location substantially limits movement of the tire pressure monitoring device with respect to the programming device.

5. The method as recited in claim 4, wherein mounting location includes an opening defining a shape that corresponds to an outer shape of the tire pressure monitoring device.

6. The method as recited in claim 5, wherein the mounting location orientates the tire pressure monitoring device widthwise and generally parallel with respect to the user interface.

7. The method as recited in claim 2, wherein loading of the selected one of the first program or the second program from the first memory device of the programming device to a second memory device comprises flash programming the tire pressure monitoring device physically supported on the programming device.

8. The method as recited in claim 2, wherein the programming device wirelessly programs the tire pressure monitoring device.

9. The method as recited in claim 6, wherein the programming device communicates with the tire pressure monitoring device through a low frequency transmission.

10. The method as recited in claim 1, further comprising the step of actuating the user interface of the programming device to communicate a desired communication protocol to the tire pressure monitoring device.

11. The programming system as recited in claim 1, wherein the user interface comprises a plurality of individually operable buttons representing a different one of the plurality of selectable programs.

12. The programming system as recited in claim 1, wherein the programming device includes a display and the user interface comprises a plurality of buttons operable to select items viewable on the display including one of the first program or the second program.

13. The programming system as recited in claim 2, wherein the physical interface and user interface are combined into a single integrated unit.

14. A method of installing a tire pressure monitoring device comprising:
   mounting a tire pressure monitoring device onto a programming device to establish a communication link between the tire pressure monitoring device and the programming device, wherein the tire pressure monitoring device includes a programmable memory and a transmitter/receiver capable of communicating wirelessly with a receiver of a vehicle based upon instruction stored in the programmable memory;
   transferring a selectable one of a first program or a second program from a memory device in the programming device to the programmable memory of the tire pressure monitoring device through the established communication link, the first program configured to govern operations and communications of the tire pressure monitoring device according to a first protocol associated with a first automobile manufacturer, the second program configured to govern operations and communications of the tire pressure monitoring device according to a second protocol associated with a second automobile manufacturer, the selection being accomplished by an indicator that is non-specific to an automobile manufacturer,
   installing the tire pressure monitoring device on at least one wheel of the vehicle including the receiver; and
   deactivating a third program that has been active immediately before the deactivation occurs at the tire pressure monitoring device upon selection of the first program or the second program, the deactivation occurring after initialization of the tire pressure monitoring device is complete.

15. The method as recited in claim 14, wherein the programming device defines a mounting location for receiving and holding the tire pressure monitoring device during transfer of the program, wherein the mount location comprises a cavity including a shape configured for receiving the tire pressure monitoring device.

16. The method as recited in claim 15, wherein the mounting location substantially limits movement of the tire pressure monitoring device with respect to the programming device.

17. The method as recited in claim 16, wherein the mounting location includes an opening defining a shape that corresponds to an outer shape of the tire pressure monitoring device.

18. The method as recited in claim 17, wherein the mounting location orientates the tire pressure monitoring device widthwise and generally parallel with respect to a user interface of the programming device.

19. The method as recited in claim 15, wherein mounting of the tire pressure monitoring device further includes establishing a physical electrical connection between the tire pressure monitoring device and the programming device.

20. The method as recited in claim 14, wherein establishing the communication link comprises establishing a wireless link between the programming device and the tire pressure monitoring device.

21. The method as recited in claim 20, including actuation of portions of a user interface of the programming device for selecting one of the first program or the second program stored in the memory device of the programming device.

22. The method as recited in claim 21, wherein the user interface
   comprises a display and manually operable features actuateable for initiating communication of one of the first program or the second program stored in the memory device of the programming device to the programmable memory of the tire pressure monitoring device.

23. A method of programming a tire pressure monitoring device comprising:
   forming a physical interface between a tire pressure monitoring device and a programming device for holding the tire pressure monitoring device on the programming device, wherein the physical interface includes a mount for holding the tire pressure monitoring device on the programming device, the programming device including a first memory including a first program and a second program, the first program configured to govern operations and communications of the tire pressure monitoring device according to a first protocol associated with a first automobile manufacturer, the second program configured to govern operations and communications of the tire pressure monitoring device according to a second protocol associated with a second automobile manufacturer;
   deactivating a currently selected program that has been active immediately before the deactivation occurs, the currently selected program in a second memory device of the tire pressure monitoring device, the deactivation occurring after initialization of the tire pressure monitoring device is complete;
   selecting through a user interface of the programming device a different one of the first program and a second program, the selection being accomplished by an indicator that is non-specific to an automobile manufacturer; and loading the selected one of the first program and a second program from the first memory device of the programming device to the second memory device disposed within the tire pressure monitoring device.

24. The method as recited in claim 23, wherein the physical interface includes a physical electric connection between the tire pressure monitoring device and the programming device, and the selected first program or second program is loaded from the first memory device to the second memory device over the physical electrical connection.

25. The method as recited in claim 23, wherein loading of the first program and a second program from the first memory device of the programming device to a second memory device comprises flash programming the tire pressure monitoring device physically supported on the programming device.

26. A method of programming a tire pressure monitoring device comprising:

receiving from a first memory of a programming device a first program or a second program, the first program configured to govern operations and communications of the tire pressure monitoring device according to a first protocol associated with a first automobile manufacturer, the second program configured to govern operations and communications of the tire pressure monitoring device according to a second protocol associated with a second automobile manufacturer, wherein a mounting location of the programming device and the tire pressure monitoring device has a physical interface formed there between comprising a cavity corresponding to a shape of the tire pressure monitoring device;

loading the selected one of the received first program or the received second program to a second memory device disposed within the tire pressure monitoring device, the selection being accomplished by an indicator that is non-specific to an automobile manufacturer; and wherein a third program in the tire pressure monitoring device is deactivated after initialization of the tire pressure monitoring device is complete and the first program or the second program has been loaded into the second memory device, the third program having been active immediately before the deactivation occurs.

27. The method of claim 26 wherein the tire pressure monitoring device operates according to the selected one of the first program and the second program, and is not re-programmed.

28. The method of claim 26, wherein the physical interface includes a physical electric connection between the tire pressure monitoring device and the programming device, and the selected first program or the second program is loaded from the first memory device to the second memory device over the physical electrical connection.

29. The method of claim 26, wherein the mounting location substantially limits movement of the tire pressure monitoring device with respect to the programming device.

30. The method as recited in claim 26, wherein the mounting location includes an opening defining a shape that corresponds to an outer shape of the tire pressure monitoring device.

31. The method as recited in claim 26, wherein the mounting location orientates the tire pressure monitoring device widthwise and generally parallel with respect to the user interface.

32. A non-transient computer usable medium having a computer readable program code embodied therein, said computer readable program code adapted to be executed to implement a method of programming a tire pressure monitoring device, the method comprising:

receiving from a first memory of a programming device a first program or a second program, the first program configured to govern operations and communications of the tire pressure monitoring device according to a first protocol associated with a first automobile manufacturer, the second program configured to govern operations and communications of the tire pressure monitoring device according to a second protocol associated with a second automobile manufacturer, wherein a mounting location of the programming device and tire pressure monitoring device have a physical interface formed there between comprising a cavity corresponding to a shape of the tire pressure monitoring device;

loading the selected one of the received first program or the received second program to a second memory device disposed within the tire pressure monitoring device, the selection being accomplished by an indicator that is non-specific to an automobile manufacturer; and deactivating a third program that has been active immediately before the deactivation occurs on the tire pressure monitoring device, the deactivation occurring after initialization of the tire pressure monitoring device is complete and the first program or the second program has been loaded into the second memory device.

33. The non-transient computer usable medium of claim 32 wherein the tire pressure monitoring device operates according to the selected one of the first program and the second program, and is not re-programmed.

* * * * *